United States Patent [19]
Yamada

[11] Patent Number: 5,002,134
[45] Date of Patent: Mar. 26, 1991

[54] ROTARY IMPACTING APPARATUS

[75] Inventor: Sakuji Yamada, Kobe, Japan
[73] Assignee: Yamada Juki Co., Ltd., Kobe, Japan

[21] Appl. No.: 506,539
[22] Filed: Apr. 9, 1990

Related U.S. Application Data

[63] Continuation of Ser. No. 201,217, Jun. 2, 1988, abandoned.

[30] Foreign Application Priority Data

Jun. 17, 1987 [JP] Japan ........................ 62-150921

[51] Int. Cl.[5] ........................ B23B 45/16
[52] U.S. Cl. ........................ 173/94; 173/98
[58] Field of Search ........................ 173/94, 114, 122, 133, 173/96, 98

[56] References Cited

U.S. PATENT DOCUMENTS 2,079,909 5/1937 Jackson ........................ 173/94
2,500,402 3/1950 Craig ........................ 173/94
3,160,217 12/1964 Raihle ........................ 173/94

FOREIGN PATENT DOCUMENTS 1358674 7/1974 United Kingdom .

*Primary Examiner*—Paul A. Bell
*Assistant Examiner*—Willmon Fridie, Jr.
*Attorney, Agent, or Firm*—William H. Eilberg

[57] ABSTRACT

A rotary impacting apparatus comprises rotary member drivingly rotated about a rotational axis within a casing. An impact member is loosely held by the rotary member so as to be movable toward and away from the rotational axis within a limited range. A holder mounted to the casing slidably supports a reciprocative member to allow movement thereof toward and away from the rotational axis within a limited range. The reciprocative member has a contact surface which interferes with the impact member rotating about the rotational axis when the reciprocative member is positioned closest to the rotational axis.

13 Claims, 13 Drawing Sheets

ROTARY IMPACTING APPARATUS

This application is a continuation of application Ser. No. 07/201,217, filed June 2, 1988, now abandoned.

BACKGROUND OF THE INVENTION

1. Field of the Invention

This invention relates generally to impacting apparatuses which generate impacts required for example to break hard solids or to drive piles into the ground. More particularly, the invention relates to a rotary impacting apparatus.

2. Description of the Prior Art

As is well known, impacting apparatuses have various applications. Chiefly, they can be used to break hardened concrete or asphalt solids at construction sites by using a chisel as a working tool. By selecting suitable working tools, they can also be used to drive piles into grounds or to stamp loose grounds or uncured asphalt pavements.

Conventional impacting apparatuses, particularly solids breakers, can be classified mainly into two types, that is, compressor operated type and engine operated type.

A typical breaker of the compressor operated type comprises a vertically extending cylindrical main body connected to an air compressor through pressure hoses, and a piston reciprocated up and down within the main body by expansion of compressed air supplied to the main body from the compressor. Upon each downward stroke, the piston hits a chisel provided at the lower end of the main body.

With the compressor operated breaker, the piston must be repetitively accelerated and decelerated against its inertial mass, so that it is difficult to achieve a high impacting frequency and to avoid vibration resulting from such reciprocation. Further, because of sliding reciprocation of the piston with resultant heat generation, the cylindrical main body must be made of a tough and heavy material, consequently making large the total weight of the apparatus including the compressor (also heavy). More importantly, the compressor is very high in energy consumption.

On the other hand, a typical breaker of the engine operated type is disclosed for example in UK Patent No. 1,358,674. Specifically, the breaker of this patent comprises a vertically extending cylindrical main body in which a movable cylinder is slidably reciprocated up and down by an engine connected thereto via a crank mechanism. A free piston is slidably guided within the movable cylinder and divides the interior thereof into two pressure chambers. The free piston has an impact rod hermetically projecting downward through an end wall of the movable cylinder. When the movable cylinder is reciprocated, the two pressure chambers are alternately compressed by inertial delay of the free piston to reciprocate the piston upon subsequent expansion of the pressure chambers. On each downward stroke of the piston, the impact rod hits a chisel provided at the lower end of the main body.

The engine operated breaker needs no compressor, so that it is much higher in energy efficiency. However, the use of the movable cylinder and the free piston, which are reciprocating parts, is disadvantageous in view of unacceptable vibration, limitation on achievable impacting frequency, and inevitable weight increase, as described with respect to the compressor operated breaker. Further, the engine operated breaker requires a number of components in a complicated arrangement.

Both types of prior art breakers or impacting apparatuses rely on air compression and expansion as well as on gravity acting on the piston and/or the movable cylinder. Therefore, the prior art impacting apparatus cannot be used in a non-atmospheric or non-gravitational condition, that is, in the space. This is of great disadvantage in view of recent space developments. Moreover, reliance on gravity poses a difficulty in operating the apparatus in a horizontal or upwardly directed posture.

SUMMARY OF THE INVENTION

It is, therefore, an object of the invention to provide an impacting apparatus which, with a small number of components and with a light weight, can be used even in a non-gravitational and/or non-atmospheric condition and in any posture, and which is capable of achieving high impacting frequency.

Another object of the invention is to provide a rotary impacting apparatus which can be operated with reduced vibration and heat generation.

A further object of the invention is to minimize the overall weight of the rotary impacting apparatus.

According to the invention, there is provided a rotary impacting apparatus comprising: a rotary member drivingly rotated about a rotational axis and provided with arresting means at a position spaced from the rotational axis; at least one impact member loosely held by the arresting means for rotation with the rotary member about the rotational axis, the impact member being movable toward and away from the rotational axis within a limited range; and a reciprocative member supported to move toward and away from the rotational axis within a limited range, the reciprocative member having a contact surface which interferes with the impact member rotating about the rotational axis when the reciprocative member is positioned closest to the rotational axis.

Other objects, features and advantages of the invention will become apparent from the following detailed description given with reference to the accompanying drawings.

DESCRIPTION OF THE PREFERRED EMBODIMENTS

Figure 1:
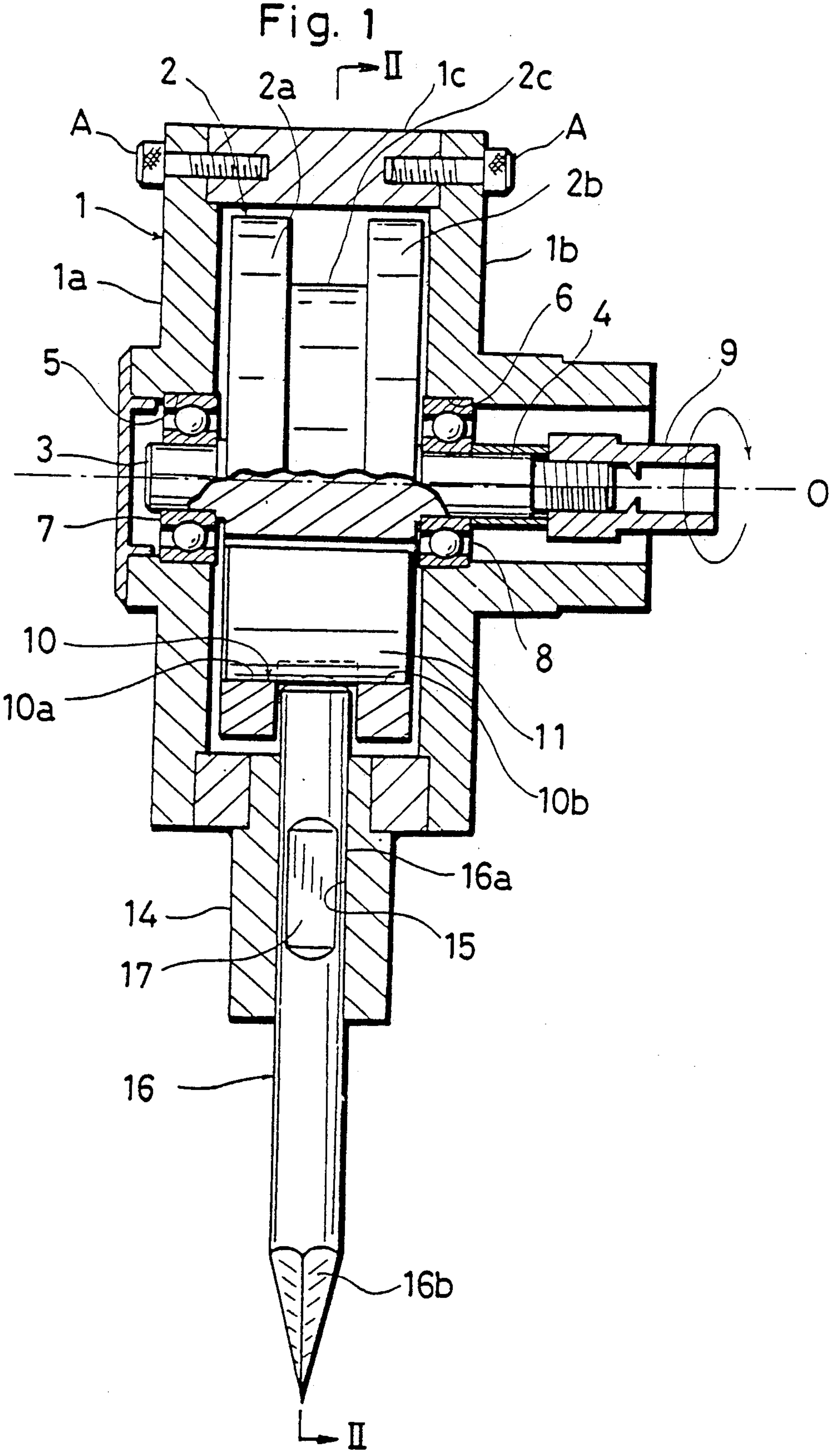
FIG. 1 is a sectional side view of a rotary impacting apparatus according to a first embodiment of the invention.
Figure 2:
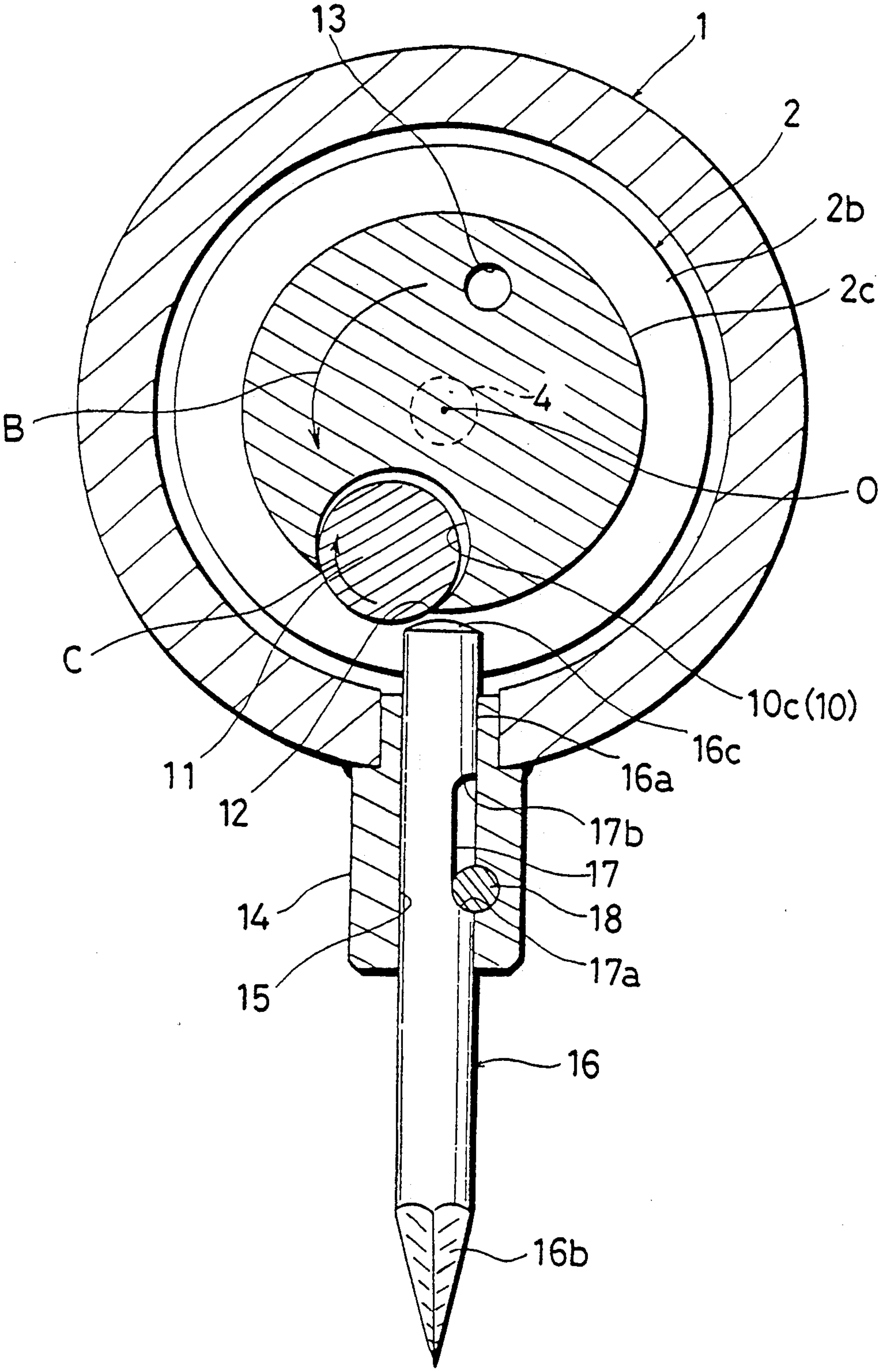
FIG. 2 is a sectional view taken on lines II—II in FIG. 1.

Referring to FIGS. 1 to 2 of the accompanying drawings, there is illustrated a rotary impacting apparatus which comprises a casing 1 accommodating a rotary member 2. The casing 1 includes a cylindrical wall 1*c* joined to a pair of end covers 1*a,* 1*b* by suitable means such as bolts A.

The rotary member 2, which is circular according to this embodiment, comprises a pair of diametrically larger side flanges 2*a,* 2*b* and a diametrically smaller intermediate portion 2*c* integrally interposed between the pair of flanges 2*a,* 2*b.* The rotary member 2 further has a pair of support shafts 3, 4 extending laterally outward from the respective flanges 2*a,* 2*b* to provide a common rotational axis O for the rotary member. The pair of shafts 3, 4 are rotatably received in a corresponding pair of ball bearings 7, 8 which are respectively fitted in a pair of mounting bores 5, 6 each formed in a corresponding end cover 1*a* (1*b*) of the casing. One support shaft 4 is connected to a drive source (not shown) through a transmission shaft 9. The drive source may be of any type, such as an electric motor or gasoline powered engine, which is capable of providing rotational output.

The rotary member 2 is provided with a reception bore 10 at a position spaced from the rotational axis O defined by the support shafts 3, 4. The reception bore 10 extends parallel to the rotational axis O through the entire thickness of the rotary member 2. According to this embodiment, the reception bore 10 consists of two completely circular holes 10*a,* 10*b* formed in the side flanges 2*a,* 2*b,* respectively, and one incompletely circular hole 10*c* formed in the intermediate portion 2*c* (FIG. 2). More specifically, the incompletely circular hole 10*c* has a circumferential opening 12 in the peripheral surface of the intermediate portion 2*c.* The opening 12 has a width smaller than the diameter of the reception bore 10. The purpose of this opening will be described below.

Within the reception bore 10 is disposed an impact member 11 which is columnar according to this embodiment. The diameter of the reception bore 10 is slightly larger than that of the columnar impact member 11. Therefore, the impact member 11 is rotatable about its own axis, and movable toward and away from the rotational axis O of the rotary member 2 to the extent allowed by the difference in diameter between the reception bore 10 and the impact member 11. While the rotary member 2 rotates, the impact member 11 is centrifugally brought farthest from the rotational axis O of the rotary member 2, so that the impact member 11 projects partially through the circumferential opening 12.

The rotary member 2 is further provided with a balancing bore 13 (FIG. 2) at a position diametrically opposite the reception bore 10. The size of the balancing bore 13 is determined depending the weight of the impact member 11 and the size of the gap between the reception bore 10 and the impact member 11, so that the gravitational center of the rotary member 2 (including the impact member 11) coincides with the rotational axis O thereof. In case the impact member 11 is larger in specific weight (material weight per unit volume) than the rotary member, it is sometimes necessary to replace the balancing bore 13 by a balancing weight (not shown). The balancing bore 13 (or balancing weight) serves to eliminate vibration during rotation of the rotary member.

The cylindrical wall 1*c* of the casing 1 is provided at a suitable portion thereof with a holder 14 which has a guide bore 15 extending radially of the rotary member 2 and communicating with the interior space of the casing 1. A reciprocative member 16 is slidably inserted into the guide bore 15.

According to this embodiment, the reciprocative member 16 is in the form of a chisel having a shank 16*a,* a tapering tip 16*b* and a rounded head 16*c.* The shank 16*a,* which is fitted in the guide bore 15 of the holder 14, is partially cut away to provide a flat surface 17 bounded axially by a first stopper face 17*a* and a second stopper face 17*b.* On the other hand, a stopper pin 18 extending perpendicularly to the chisel 16 is inserted into the boss 14 so as to partially project into the guide bore 15 in corresponding relation to the flat surface 17. Therefore, the chisel 16 is axially reciprocative within a limited stroke defined by the first and second stopper faces 17*a,* 17*b* which are engageable with the stopper pin 18.

When the chisel 16 is brought closest to the rotational axis O of the rotary member 2 with the first stopper face 17*a* engaging the stopper pin 18, the rounded head 16*c* interferes slightly with the impact member 11 rotating about the rotational axis O of the rotary member 2 and centrifugally brought farthest therefrom. Preferably, the rounded head 16*c* of the chisel 16 should be subjected to surface treatment to have an increased abrasion resistance. It should be noted in this connection that the shank 16*b* itself (e.g. the upper edge in FIG. 2) of the chisel 16 should not interfere with the impact member 11 because this will result in application of unacceptably large transverse impacts onto the chisel 16 in addition to hindering smooth rotation of the rotary member 2.

In operation, the tapering tip 16*b* of the chisel 16 is pressed against a solid workpiece (not shown) made of concrete or hardened asphalt for example, so that the chisel 16 assumes the position of FIG. 2 in which the rounded head 16*c* is located closest to the rotational axis O of the rotary member 2. Subsequently, the rotary member 2 is driven into rotation as indicated by an arrow B in FIG. 2, whereby the impact member 11 centrifugally brought farthest from the rotational axis O of the rotary member 2 impinges on the rounded head 16*c* every time the rotary member 2 makes one full rotation. In this way, a centrifugal force acting on the rotary member 11 as well as a kinetic energy thereof (resulting from rotation about the rotational axis O of the rotary member 2) is effectively transmitted to drive the chisel 16 into the workpiece to conduct intended workpiece breaking. Naturally, the impact applied to the chisel 16 increases as the rotational speed of the rotary member 2 increases.

Upon impingement on the chisel 16, the impact member 11 receives an impact reaction force which causes the impact member 11 to roll on the wall surface of the reception bore 10 as indicated by an arrow C in FIG. 2. Such rolling of the impact member 11 serves to absorb the impact reaction force before being transmitted to the casing 1. Further, the rollability of the impact member 11 also serves to reduce friction and frictional heat generation between the impact member 11 and the rounded head 16*c* of the chisel 16, thereby prolonging the service life of the chisel 16 and the impact member 11.

After its rotational travel past the rounded head 16*c* of the chisel 16, the impact member 11 is centrifugally brought again to its radial position farthest from the rotational axis O of the rotary member 2. Before subsequent impingement on the chisel 16, the rotary member 2 incorporating the impact member 11 is rotationally balanced by the balancing bore 13, so that the rotary member 2 rotates smoothly without generation of vibration.

It is far easier to achieve high speed rotation of the rotary member 2 than to obtain high speed reciprocation of a piston or a movable cylinder (prior art) against an inertial mass. Therefore, the present invention enables high frequency impacting.

Further, the absence of a slidably reciprocating piston or cylinder reduces frictional heat production in addition to providing readier lubrication.

More importantly, the rotary impacting apparatus of the invention utilizes a centrifugal force acting on the impact member 11 without any dependence upon gravity or air compression. Therefore, it is possible to use the rotary impacting apparatus with the chisel 16 directed upwardly or laterally and in a non-atmospheric condition.

If desired, the rotary member 2 may be provided with one or more additional reception bores arranged at equal angular spacing for receiving one or more additional impact members. In this case, each impact member combined with its reception bore can serve also as balancing means for another impact member combined with its reception bore. Naturally, such a modification increases achievable impacting frequency.

The invention may be further developed in the following manner. In the following description, parts which are identical or similar to those illustrated in FIGS. 1 and 2 are referred to by the same reference numerals and characters as used in these figures for convenience of explanation.

Figure 3:
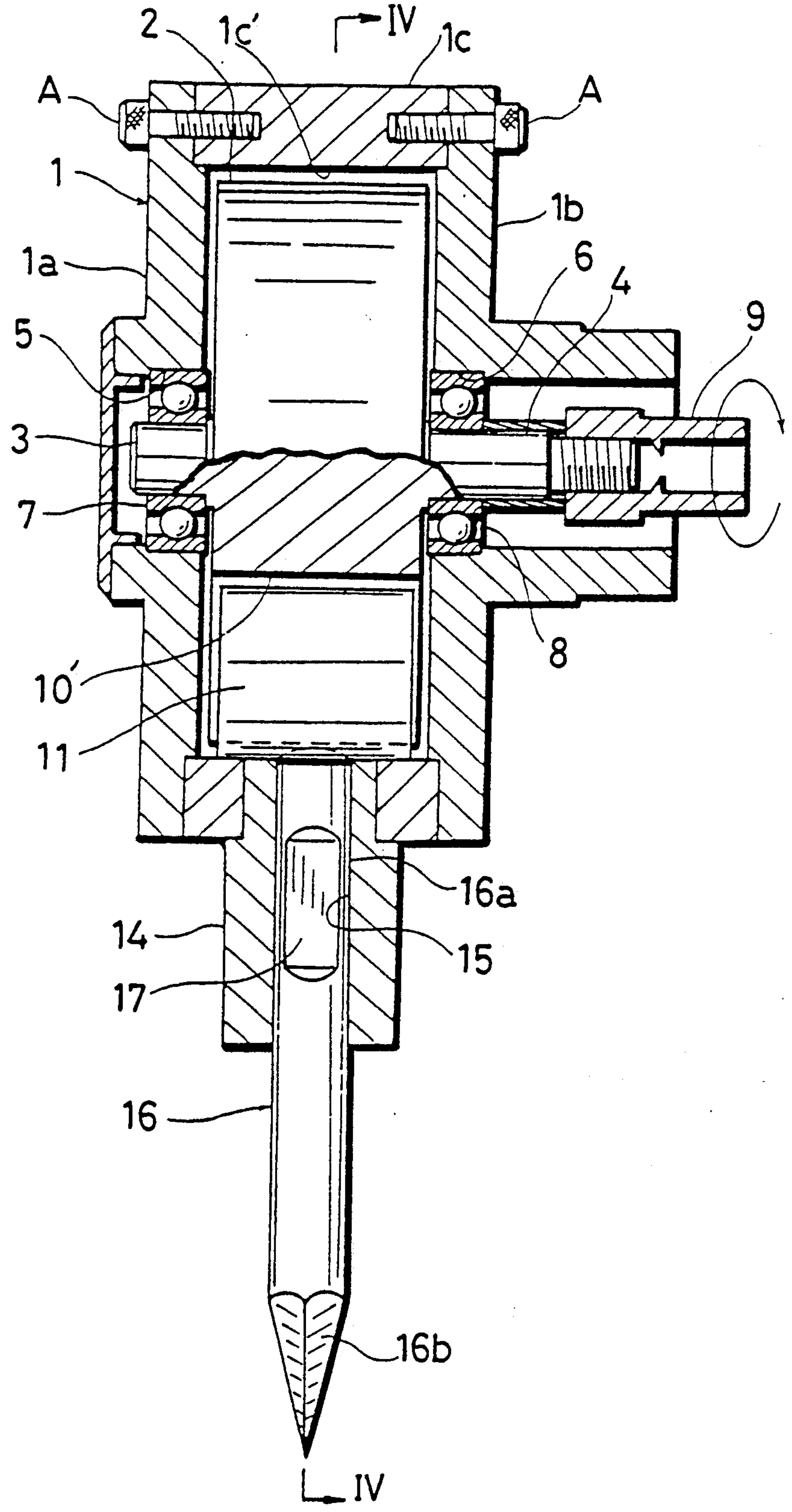
FIG. 3 is a sectional side view of a rotary impacting apparatus according to a second embodiment of the invention.
Figure 4:
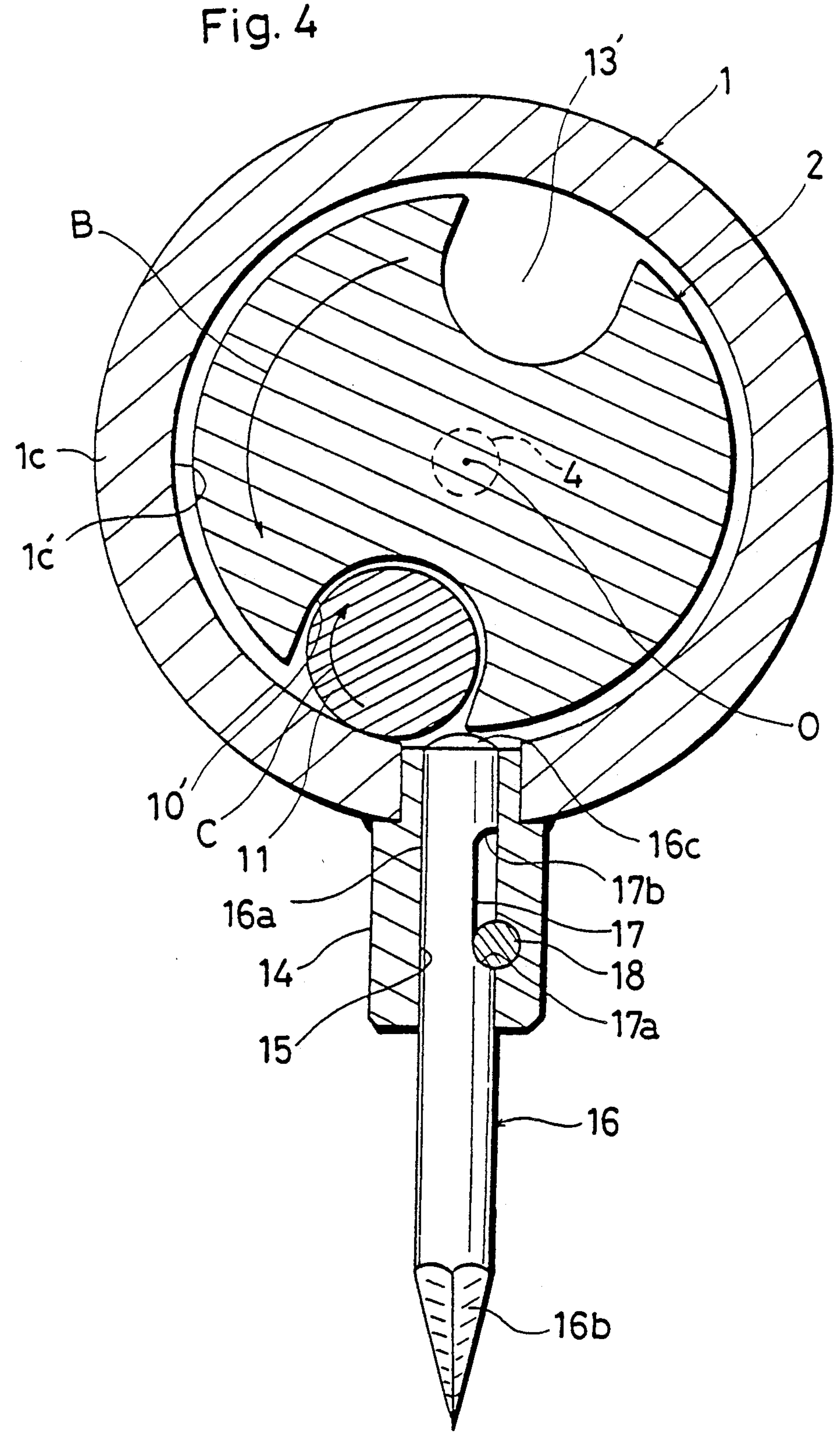
FIG. 4 is a sectional view taken on lines IV—IV in FIG. 3.

FIGS. 3 and 4 show a second embodiment of the invention in which a circular rotary member 2 rotatably accommodated in a casing 1 is constant in cross-sectional shape throughout the entire thickness thereof. The rotary member 2 has a U-shaped reception cutout 10′ for receiving a columnar impact member 11 while allowing it to move slightly toward and away from the rotational axis 0 of the rotary member 2. The rotary member 2 further has a U-shaped balancing cutout 13′ so that the center of gravity of the rotary member 2 coincides with its rotational axis O.

According to the second embodiment, the impact member 11 rolls on the inner circumferential surface 1*c*′ of the casing 1 during rotation of the rotary member 2. Therefore, the impact member 11 hits the rounded head 16*c* of the chisel 16 substantially without friction therebetween.

Unlike the embodiment of FIGS. 1 and 2, the balancing cutout 13′ of this second embodiment is substantially identical in size and shape to the reception cutout 10′. This is because the centrifugal force acting on the impact member 11 is received by the casing 1 but not by the rotary member 2.

Figure 5:
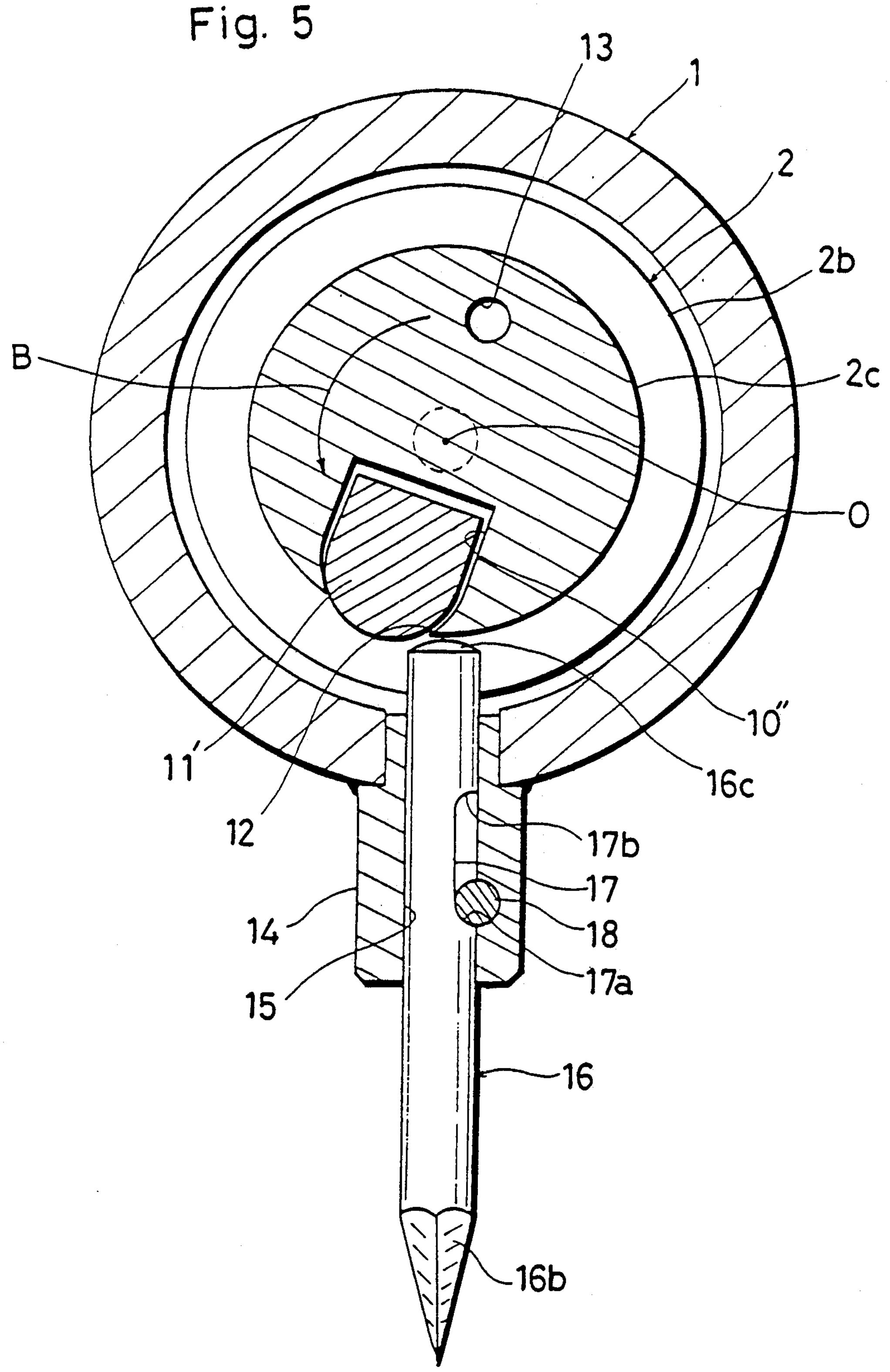
FIG. 5 is a sectional view similar to FIG. 4 but showing a rotary impacting apparatus according to a third embodiment of invention.

FIG. 5 shows a third embodiment which differs from the embodiment of FIGS. 1 and 2 only in that an impact member 11′ is U-shaped in cross section to be loosely fitted in a reception bore 10″ which is also U shaped in cross section. Naturally, the impact member 11 may take other shapes as long as it is capable of transmitting, upon impingement, a considerable axial force to the chisel 16.

Figure 6:
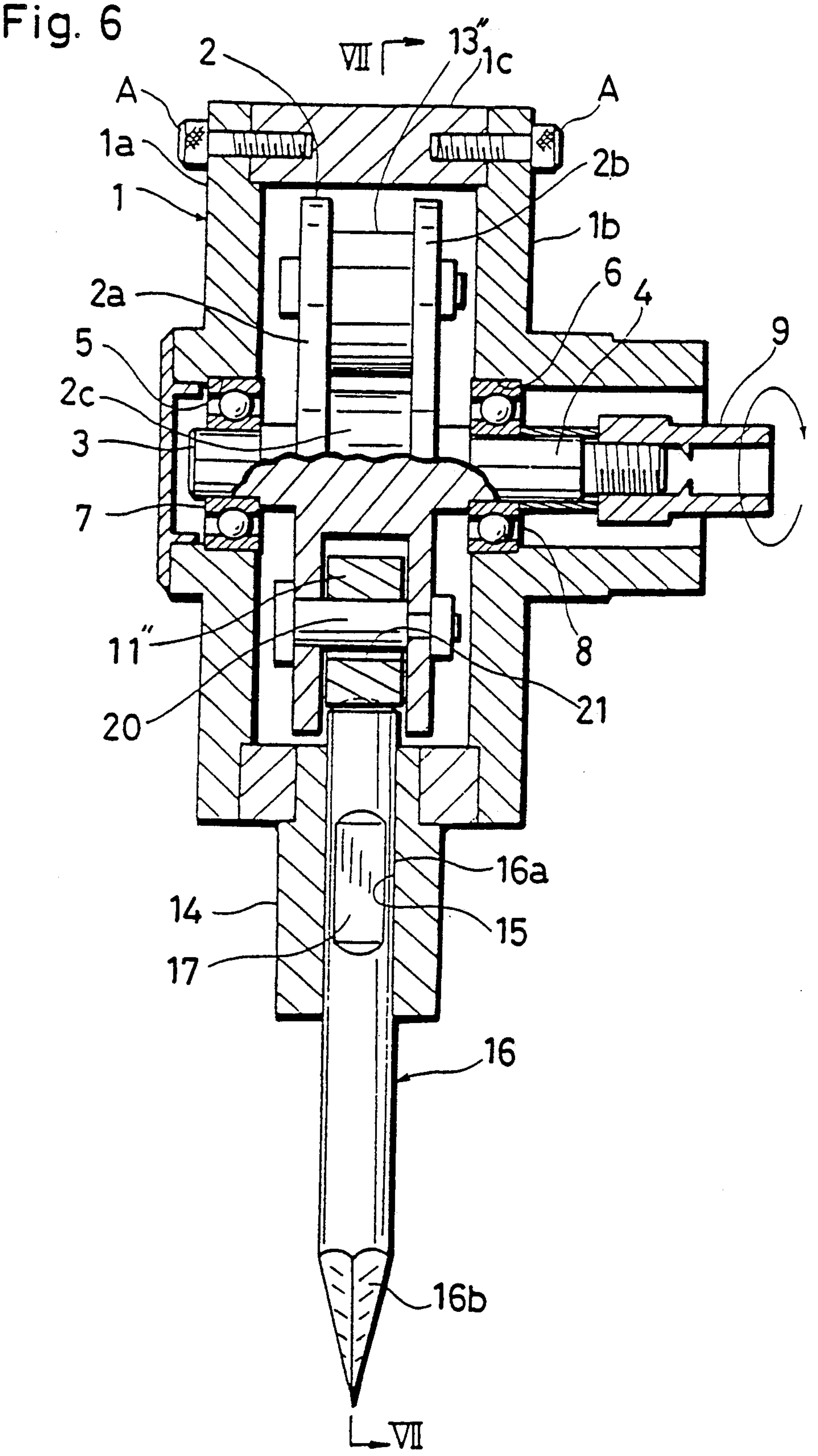
FIG. 6 is a sectional side view of a rotary impacting apparatus according to a fourth embodiment of the invention.
Figure 7:
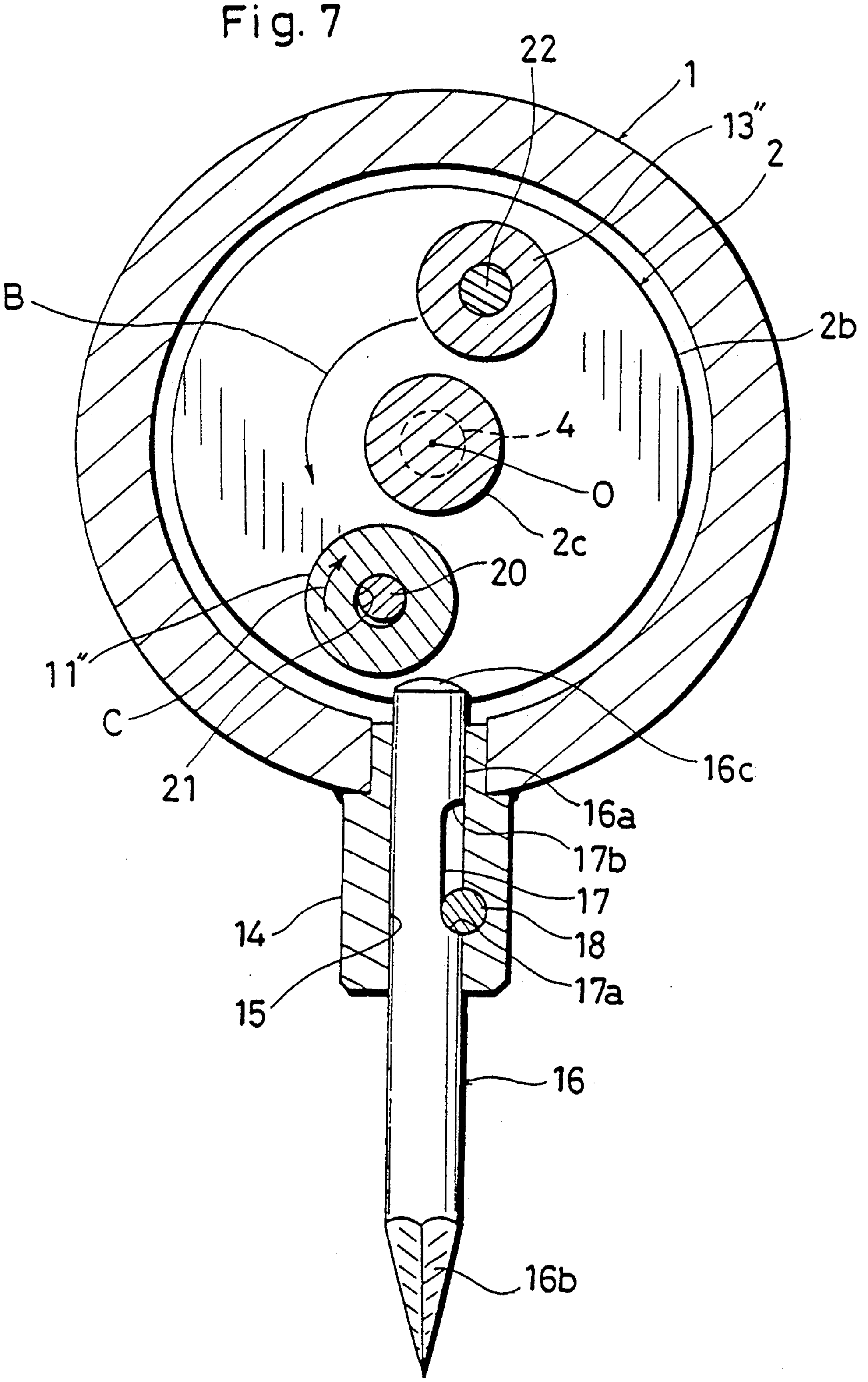
FIG. 7 is a sectional view taken on lines VII–VII in FIG. 6.

In a fourth embodiment illustrated in FIGS. 6 and 7, a rotary member 2 comprises a pair of circular side flanges 2*a*, 2*b* joined by an intermediate portion 2*c* which is far smaller in diameter to provide an enough space between the side flanges. The rotary member 2 is provided with a support pin 20 at a position radially spaced from the rotational axis O of the rotary member 2. A circular impact member 11″ is loosely fitted on the support pin 20. More specifically, the impact member 11″ has a central bore 21 which is slightly larger in diameter than the support pin 20 for loosely fitting thereon, so that the impact member 11″ is rotatable about its own axis and movable toward and away from the rotational axis O of the rotary member 2 within a limited range. Further, a balancing weight 13″ is mounted to the rotary member 2 by means of another support pin 22 at a position diametrically opposite the impact member 11″. This embodiment is otherwise the same in arrangement as the first embodiment of FIGS. 1 and 2.

The rotary impacting apparatus illustrated in FIGS. 6 and 7 is advantageous in that the rotary member 2 is lighter than that of each foregoing embodiment, thereby contributing further to overall weight reduction.

Figure 8:
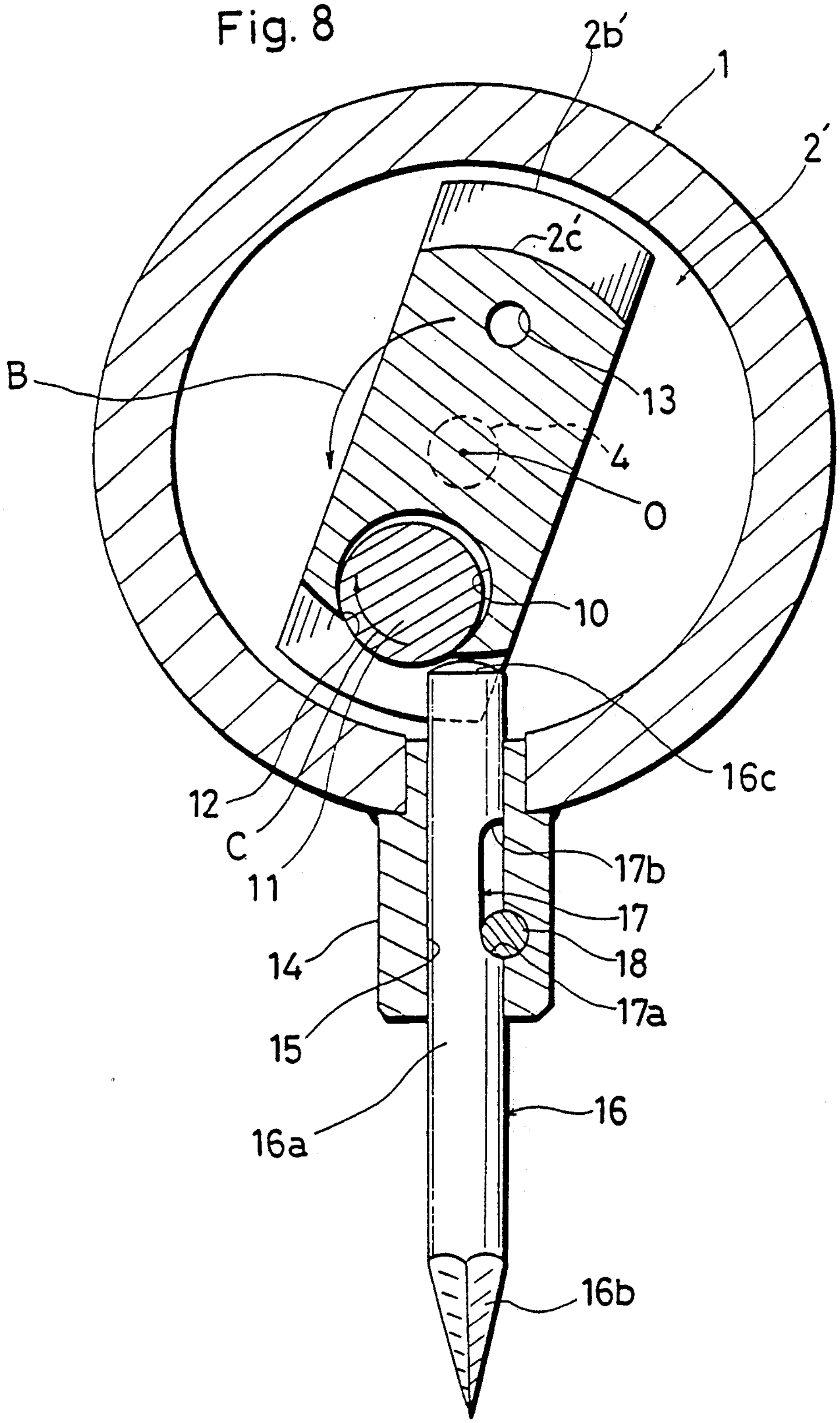
FIG. 8 is a sectional view similar to FIG. 6 but showing a rotary impacting apparatus according to a fifth embodiment of the invention.

In FIG. 8, there is illustrated still another rotary impacting apparatus incorporating an elongated rotary member 2′. More specifically, the elongated rotary member 2′ corresponds in shape to a part of a circle which is obtained by cutting the circle along a pair of parallel chords having the same length and located on opposite sides of a diametrical line. In this way, the overall weight of impacting apparatus is further reduced without losing rotational balance of the rotary member. It should be noted in this connection that the elongated rotary member may take other forms as far as it is symmetrical with respect to a diametrical line passing through the rotational axis O.

The present invention may provide various applications other than breaking solids. For example, the invention may be used for pile driving, as illustrated in FIGS. 9 and 10.

Figure 9:
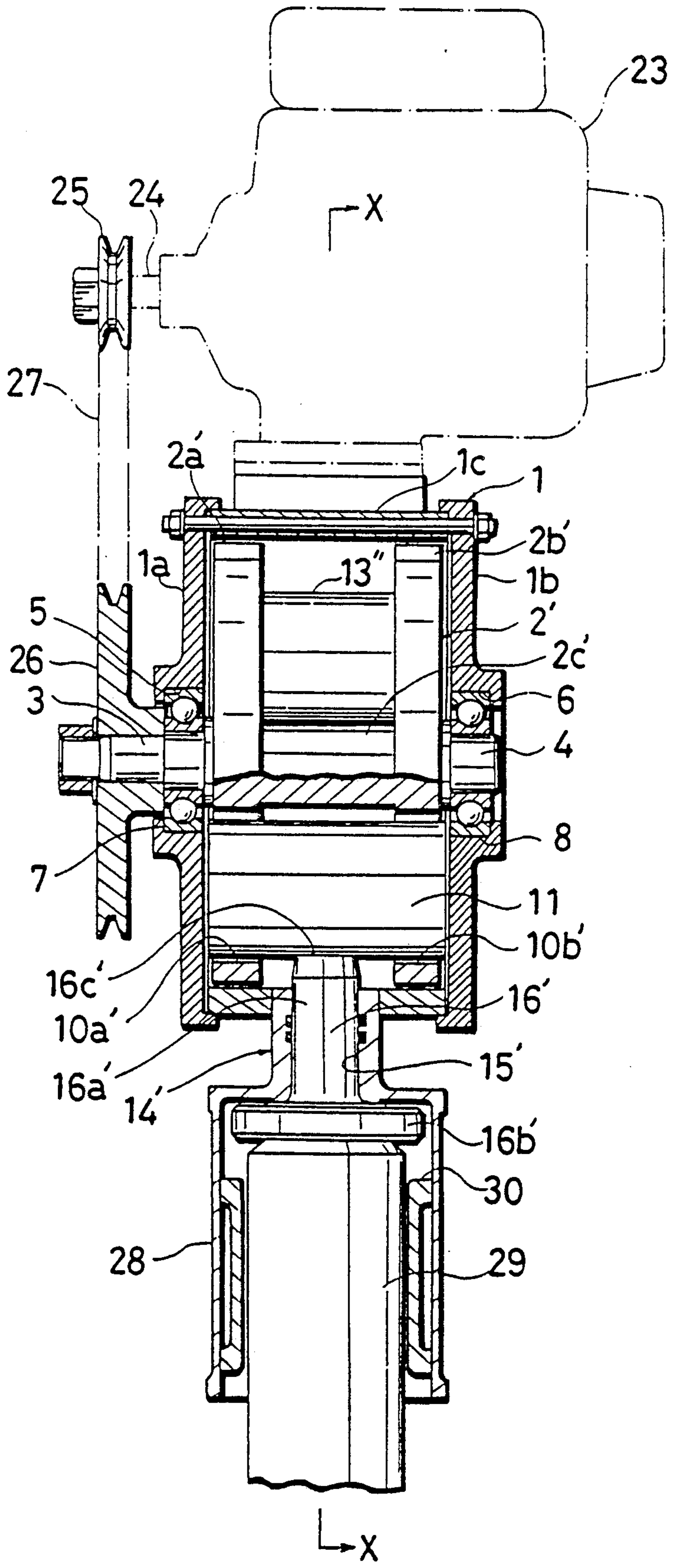
FIG. 9 is a sectional side view of a rotary impacting apparatus according to a sixth embodiment of the invention.
Figure 10:
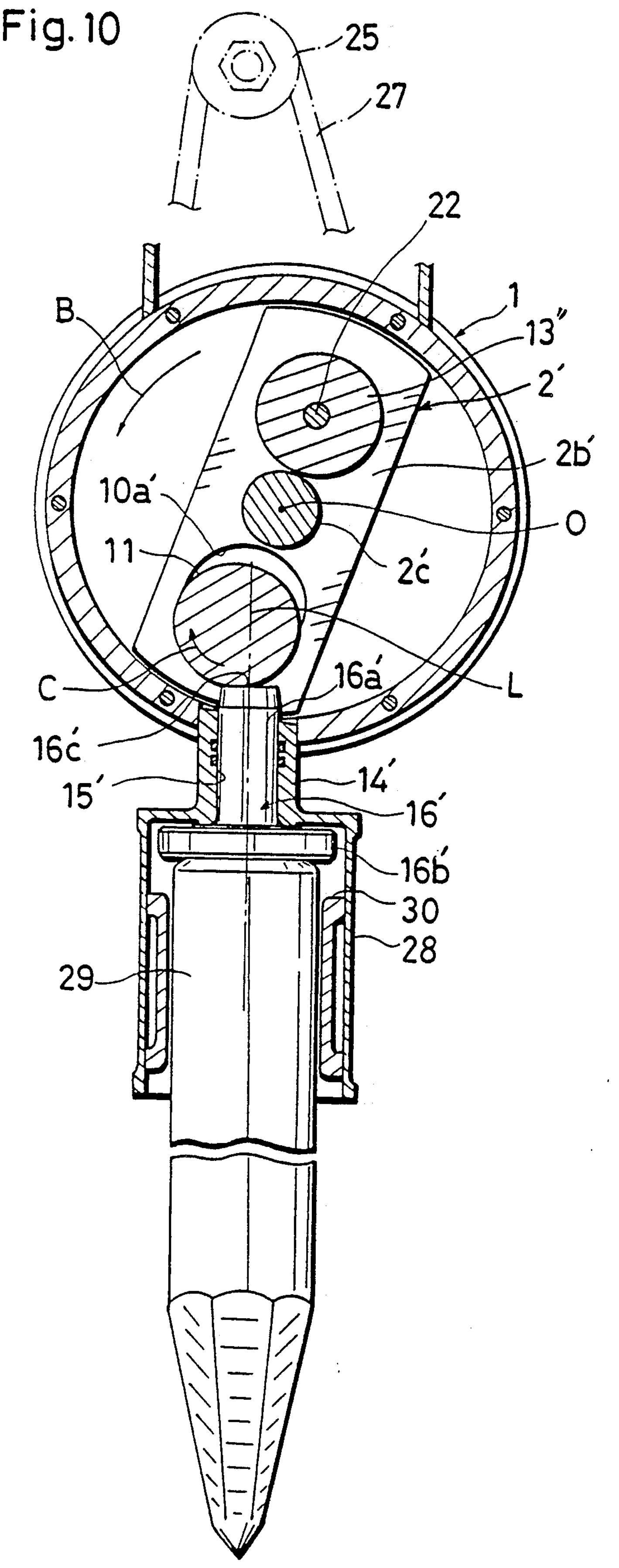
FIG. 10 is a sectional view taken on lines X—X in FIG. 9.

Referring to FIGS. 9 and 10, a small engine 23 is mounted on a casing 1 which rotatably accommodates an elongated rotary member 2′. The engine 23 has an output shaft 24 drivingly connected to one shaft 3 of the rotary member 2′ by means of pulleys 25, 26 and a belt 27.

The elongated rotary member 2′ includes a pair of side flanges 2*a*′, 2*b*′ connected by a shaft-like intermediate portion 2*c*′. The respective side flanges 2*a*′, 2*b*′ are provided with corresponding elongated holes 10a', 10b, extending toward the rotational axis O of the rotary member 2' for receiving a columnar impact member 11. Therefore, the impact member 11 is rotatable about its own axis and movable toward and away from the rotational axis of the rotary member 2' within a limited range allowed by the elongated holes. Rotational imbalance caused by the impact member 11 is compensated by a balancing weight 13'' mounted to the rotary member 2'' at a position opposite the impact member 11 by means of a support pin 22.

The casing 1 is provided with a holder 14' having a guide bore 15, for slidably receiving a reciprocative member 16' which has a shank 16a', a lower flange 16b' and a flat top surface 16c'. The holder 14' has a cylindrical cap portion 28 accommodating the flange 16b' of the reciprocative member 16' and fittable around a top portion of a pile 29. The cap portion 28 is internally provided with a stopper ring 30 which comes into abutment with the flange 16b' of the reciprocative member 16' to limit downward stroke thereof. The lower flange 16b' of the reciprocative member 16' serves to uniformly transmit impacts to the pile 29.

As apparent from FIG. 10, the guide bore 15' of the holder 14' or the shank 16a' of the reciprocative member 16' has a longitudinal axis L which extends perpendicularly to but deviates slightly from the rotational axis O of the rotary member 2'. Specifically, the longitudinal axis L deviates slightly from the rotational axis O in the direction opposite the rotational direction B of the rotary member 2'. Due to such an arrangement, only the top surface 16c' of the 20 reciprocative member 16' in its upper limit position interferes with the rotating impact member 11, so that there is no need to provide a rounded head (see FIG. 2) to prevent the impact member 11 from transversely hitting the shank 16a' of the reciprocative member 16'.

In operation, the cap portion 28 of the holder 14' is fitted on the pile 29, so that the reciprocative member 16' is raised to its upper limit position. In this condition, the engine 23 is started to rotate the rotary member 2', whereby the impact member 11 centrifugally brought farthest from the rotational axis O of the rotary member 2' impinges on the flat top surface 16c' of the reciprocative member 16' every time the rotary member 2' makes one full rotation. Obviously, the pile 29 can be quickly driven into the ground by rotating the rotary member 2' at high speed.

According to this embodiment, the flat top surface 16c' of the reciprocative member 16' comes into line contact with the cylindrical outer surface of the impact member 11 (see FIG. 9 and compare with point contact shown in FIG. 1). In this way, disadvantages (e.g. fatigue and local deformation) attendant with point contact can be avoided or reduced to prolong the life of the reciprocative member 16'. Further, the impact member 11 contacts the flat top surface 16c' of the reciprocative member 16' even after passage beyond the longitudinal axis L, thereby providing a longer contact period than if the reciprocative member 16' has a rounded head (see FIG. 2) which allows contact only until the impact member reaches the longitudinal axis of the reciprocative member. This means that the pile 29 is driven into the ground to a greater degree upon each impact by the impact member 11.

During impacting contact with the reciprocative member 16', the impact member 11 rolls on the flat top surface 16c' while gradually moving within the elongated holes 10a', 10b' toward the rotational axis O of the rotary member 2', thereby absorbing reaction shocks as well as preventing frictional heat production.

Figure 11:
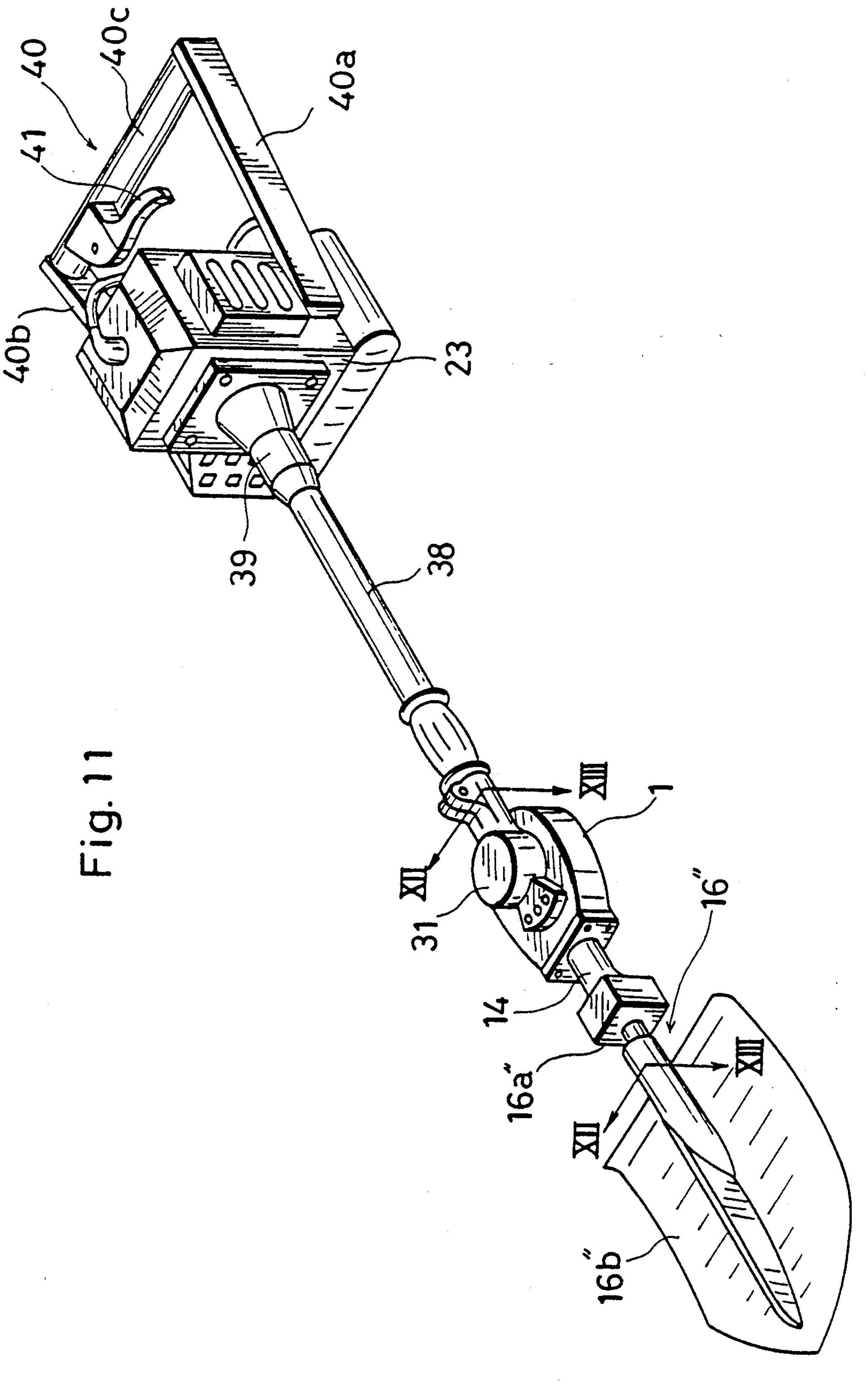
FIG. 11 is a perspective view showing an automatic shovelling device incorporating a rotary impacting apparatus according to a seventh embodiment of the invention.
Figure 12:
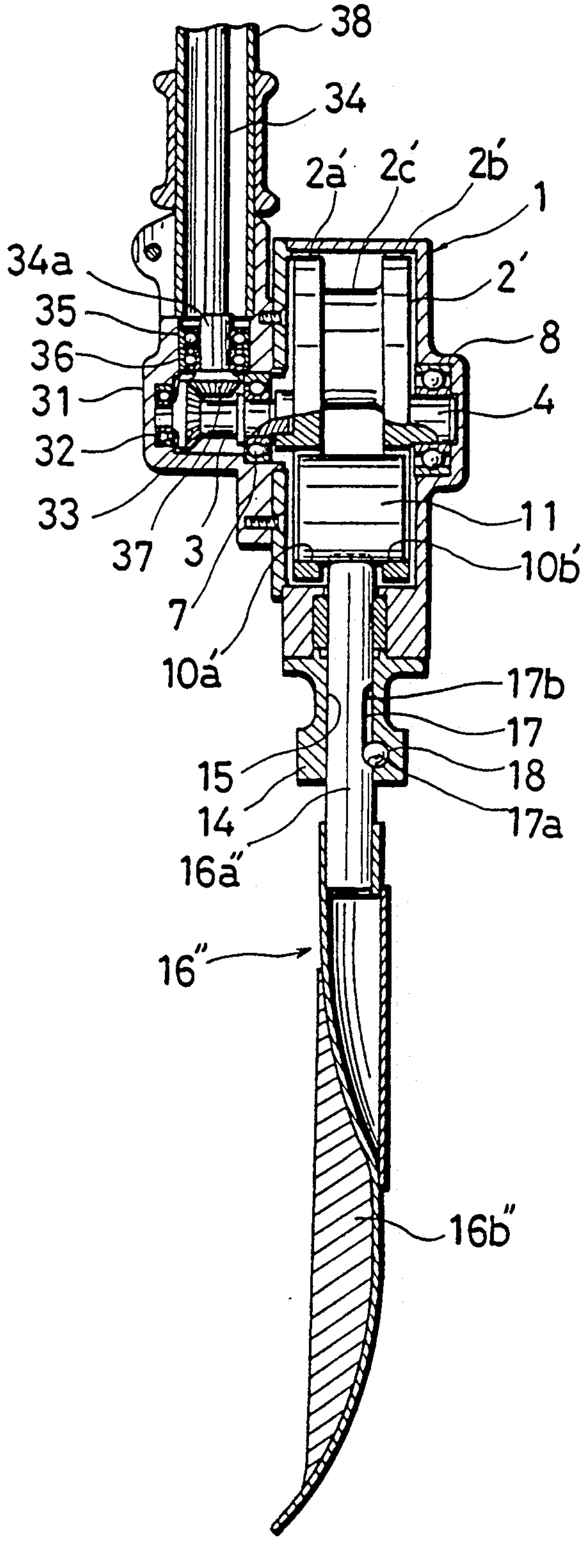
FIG. 12 is an enlarged sectional view taken on lines XII—XII in FIG. 11.
Figure 13:
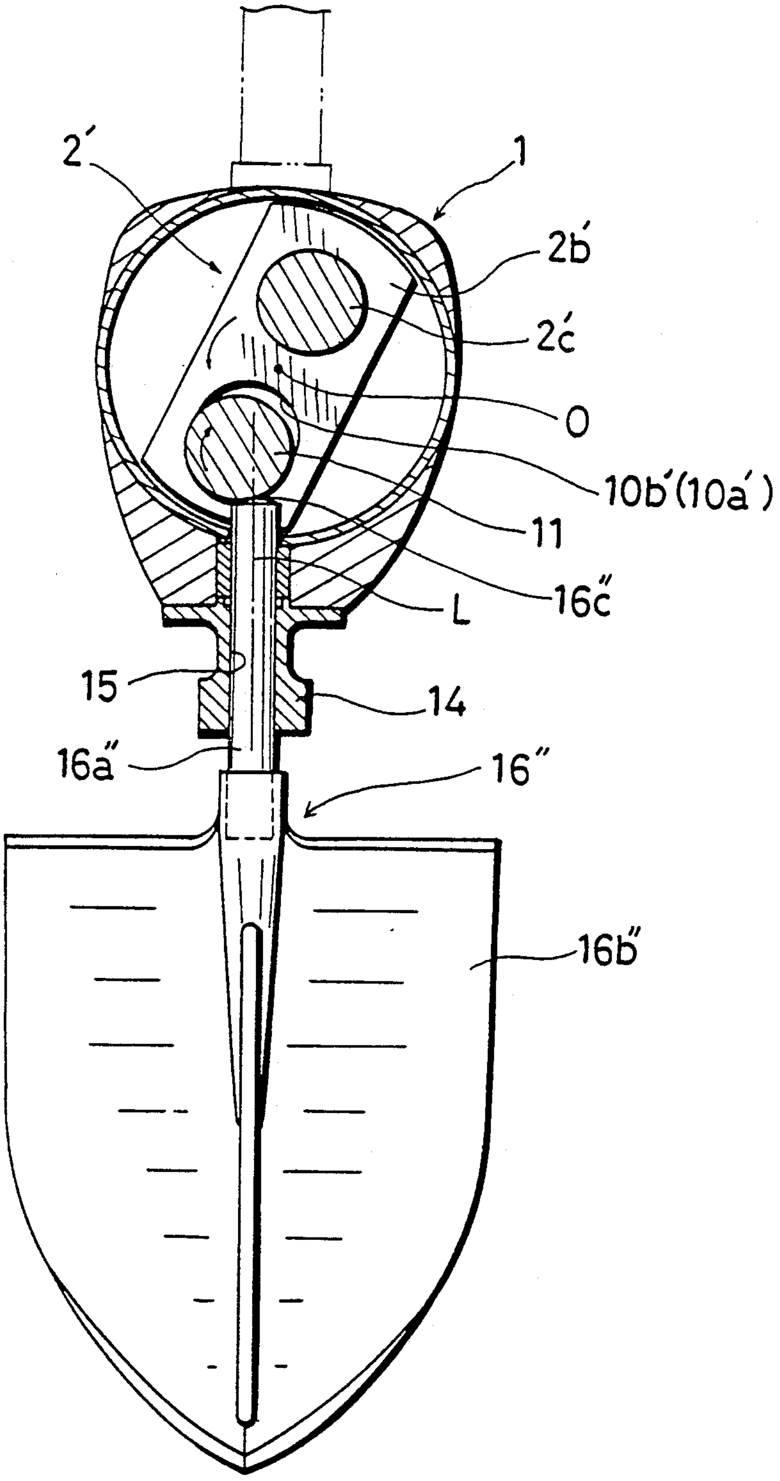
FIG. 13 is an enlarged sectional view taken on lines XIII—XIII in FIG. 11.

The rotary impacting apparatus according to the invention may also be designed for shovelling, as illustrated in FIGS. 11 to 13.

Referring to FIGS. 11 to 13, a casing 1 rotatably houses an elongated rotary member 2' which is drivingly connected to a small gasoline powered engine 23. More particularly, one shaft 3 of the rotary member 2' projects into a gear box 31 mounted to the casing 1. The shaft 3 is rotatably supported by the gear box 31 by means of bearings 7, 32, and carries a bevel gear 33. A transmission shaft 34 extending perpendicularly to the shaft 3 of the rotary member 2' has an output end 34 a projecting into the gear box 31. This output end 34a is rotatably supported by the gear box 31 by means of bearings 35, 36, and carries another bevel gear 37 in mesh with the bevel gear 33. The transmission shaft 34 is enclosed in a support tube 38 and has an input end (not shown) connected to the output shaft (not shown) of the engine 23 via a centrifugal clutch 39 (not shown in detail).

The engine 23 may be manually supported by means of a handle 40 which comprises a pair of side arms 40a and an intermediate grip 40c. The speed of the engine 23 may be adjusted by operating a throttle lever 41.

The rotary member 2' is similar to that illustrated in FIGS. 9 and 10, except that an intermediate portion 2c' joining a pair of side flanges 2a', 2b' is positioned diametrically opposite a columnar impact member 11 to serve also as a balancing weight.

According to this embodiment, a reciprocative member 16'' is in the form of a shovel or scoop including a shank 6a'', a scoop portion 16b'' and a rounded head 16c''. The scoop 16'' is reciprocatively supported by a holder 14 in a manner similar to the embodiment of FIGS. 1 and 2. Further, the scoop shank 16a' has a longitudinal axis L deviating slightly from the rotational axis O of the rotary 10 member 2' in a manner similar to the embodiment of FIGS. 9 and 10.

When the rotary member 2' is driven by the engine 23 with the scoop 16'' pressed against the ground, the scoop 16'' is advanced into the ground for scooping a desired amount of earth.

As appreciated from FIGS. 10 and 13, the reciprocative member may have either a flat top surface or a rounded head in case it has a longitudinal axis L deviating from the rotational axis O of the rotary member. However, when the reciprocative member has a longitudinal axis extending radially of the rotary member, it must have a rounded head to avoid unacceptable lateral impacts.

According to the invention, only the impact member and the balancing weight (if required) need to have a certain mass to fulfil their intended functions. Other components of the impacting apparatus may be made of light materials such as resin or light alloy.

The invention being thus described, it is obvious that the same may be varied in many ways. For instance, the reciprocative member may be designed to conduct stamping of loose grounds or uncured asphalt pavements, or trimming of hardened concrete bodies. Such variations are not to be regarded as a departure from the spirit and scope of the invention, and all such modifications as would be obvious to those skilled in the art are intended to be included within the scope of the following claims.

I claim:

1. A rotary impacting apparatus comprising:

a casing;

a rotary member drivingly rotated within said casing about a rotational axis and provided with arresting means at a position spaced from said rotational axis;

at least one impact member loosely held by said arresting means for rotation with said rotary member about said rotational axis, said arresting means allowing said impact member to move toward and away from said rotational axis within a limited range but always holding all portions of said impact member spaced from said casing radially of said rotary member; and a reciprocative member supported to move toward and away from said rotational axis within a limited range, said reciprocative member having a contact surface which interferes with said impact member rotating about said rotational axis when said reciprocative member is positioned closest to said rotational axis, wherein said impact member is circularly columnar and rotatable about a self-rotational axis;

said rotary member comprises a pair of side flanges joined by an intermediate portion; and said arresting means comprises a pair of identical holes formed in said side flanges and elongated toward said rotational axis for loosely receiving said impact member, each of said holes having a width substantially corresponding to the diameter of said impact member, each said hole having a first arcuate portion for limiting the movement of said impact member away from said rotational axis and a second arcuate portion for limiting the movement of said impact member toward said rotational axis.

2. The apparatus as defined in claim 1, wherein said rotary member is provided with balancing means for achieving rotational balance of said rotary member.

3. The apparatus as defined in claim 2, wherein said balancing means comprises a balancing weight disposed diametrically opposite said impact member.

4. The apparatus as defined in claim 2, wherein said intermediate portion is disposed diametrically opposite said impact member to serve also as said balancing means.

5. The apparatus as defined in claim 1, wherein each of said side flanges is non-circular but symmetrical with respect to a diametrical line passing through said rotational axis.

6. The apparatus as defined in claim 1, wherein said reciprocative member has a slidably supported shank, and said shank has a longitudinal axis perpendicular to said rotational axis but deviating slightly therefrom in a direction opposite the rotational direction of said rotary member.

7. The apparatus as defined in claim 6, wherein said shank is formed at one end with a flat surface to serve as said contact surface.

8. A rotary impacting apparatus comprising:

a casing;

a rotary member drivingly rotated within said casing about a rotational axis and provided with arresting means at a positions spaced from said rotational axis;

at least one impact member loosely held by said arresting means for rotation with said rotary member about said rotational axis, said arresting means allowing said impact member to move toward and away from said rotational axis within a limited range but always holding all portions of said impact member spaced from said casing radially of said rotary member; and a reciprocative member supported to move toward and away from said rotational axis within a limited range, said reciprocative member having a contact surface which interferes with said impact member rotating about said rotational axis when said reciprocative member is positioned closest to said rotational axis, wherein said impact member is circularly columnar and rotatable about a self-rotational axis;

said rotary member comprises a pair of side flanges joined by an intermediate portion; and said arresting means is in the form of a circular reception bore which is larger in diameter than said impact member, said reception bore being provided by a pair of completely circular holes formed in said side flanges as well as by an incompletely circular hole formed in said intermediate portion, said incompletely circular hole having an opening which is directed radially outwardly of said rotary member and has a width smaller than the diameter of said impact member so that said impact member projects out of said opening radially outwardly of said rotary member for interference with said contact surface of said reciprocative member.

9. The apparatus as defined in claim 8, wherein said rotary member is provided with balancing means for achieving rotational balance of said rotary member.

10. The apparatus as defined in claim 9, wherein said balancing means is disposed diametrically opposite said impact member.

11. The apparatus as defined in claim 10, wherein said balancing means is in the form of a bore formed in said rotary member.

12. The apparatus as defined in claim 8, wherein said rotary member is circular in shape.

13. The apparatus as defined in claim 8, wherein said rotary member is non-circular but symmetrical with respect to a diametrical line passing through said rotational axis.

* * * * *